United States Patent
Huang

(10) Patent No.: US 9,331,482 B2
(45) Date of Patent: May 3, 2016

(54) STATIC SYNCHRONOUS COMPENSATOR SYSTEMS AND RELATED METHODS

(71) Applicant: North Carolina State University, Raleigh, NC (US)

(72) Inventor: Qin Huang, Cary, NC (US)

(73) Assignee: North Carolina State University, Raleigh, NC (US)

( * ) Notice: Subject to any disclaimer, the term of this patent is extended or adjusted under 35 U.S.C. 154(b) by 124 days.

(21) Appl. No.: 14/071,130

(22) Filed: Nov. 4, 2013

(65) Prior Publication Data

US 2014/0132229 A1 May 15, 2014

Related U.S. Application Data

(60) Provisional application No. 61/721,548, filed on Nov. 2, 2012.

(51) Int. Cl.
*G05F 1/70* (2006.01)
*H02J 3/18* (2006.01)

(52) U.S. Cl.
CPC ............ *H02J 3/1828* (2013.01); *H02J 3/1842* (2013.01); *Y02E 40/16* (2013.01); *Y02E 40/22* (2013.01)

(58) Field of Classification Search
CPC ............ G05F 1/70; H02J 3/16; H02J 3/1864; H02J 1/102; Y02B 70/126; Y02B 40/30; Y02B 40/12
USPC ................................................ 323/205–210
See application file for complete search history.

(56) References Cited

U.S. PATENT DOCUMENTS

| | | | | |
|---|---|---|---|---|
| 3,936,727 A | * | 2/1976 | Kelley et al. | 323/210 |
| 4,434,358 A | * | 2/1984 | Apfelbeck et al. | 219/501 |
| 4,470,005 A | * | 9/1984 | Gyugyi | 323/210 |
| 4,571,535 A | * | 2/1986 | Gyugyi | 323/211 |
| 8,154,896 B2 | | 4/2012 | Angquist | |
| 2009/0033304 A1 | * | 2/2009 | Benedict | 323/284 |
| 2010/0109616 A1 | * | 5/2010 | Li et al. | 323/210 |
| 2010/0171472 A1 | | 7/2010 | Angquist | |
| 2011/0159349 A1 | | 6/2011 | Larsson et al. | |
| 2012/0063181 A1 | * | 3/2012 | Chimento et al. | 363/56.03 |
| 2012/0280569 A1 | * | 11/2012 | Alam et al. | 307/60 |
| 2013/0049728 A1 | * | 2/2013 | Fender et al. | 323/311 |
| 2015/0055387 A1 | * | 2/2015 | Tengner et al. | 363/132 |

OTHER PUBLICATIONS

STATCOM (Static Synchronous Compensator) PowerPoint Presentation given on Aug. 24, 2007.

* cited by examiner

*Primary Examiner* — Adolf Berhane
(74) *Attorney, Agent, or Firm* — Olive Law Group, PLLC

(57) ABSTRACT

Static synchronous compensator (STATCOM) systems and methods are disclosed. An example STATCOM system includes a reactive component configured for electrical connection to a power network. For example, the reactive component may be a capacitor bank. The system also includes an inductor electrically connected in series with the reactive component. Further, the system includes a converter electrically connected in series with the reactive component and the inductor. A method may include using the static synchronous compensator system to provide one of reactive power and active power to the power network.

18 Claims, 10 Drawing Sheets

(b)

STATIC SYNCHRONOUS COMPENSATOR SYSTEMS AND RELATED METHODS

CROSS REFERENCE TO RELATED APPLICATION

This application claims the benefit of U.S. Provisional Patent Application Ser. No. 61/721,548, titled STATIC COMPENSATOR SYSTEMS AND RELATED METHODS and filed Nov. 2, 2012, the disclosure of which is incorporated herein by reference in its entirety.

TECHNICAL FIELD

The presently disclosed subject matter relates to power transmission networks. Particularly, the presently disclosed subject matter relates to static synchronous compensator systems and related methods.

BACKGROUND

An electrical power transmission network delivering electricity to consumers has to be able to handle voltage imbalances or instabilities, voltage sags, poor power factor, distortion, or flicker occurring within the network. Reactive power control is one way to resolve such problems.

A static synchronous compensator (STATCOM) is an electrical device, which is based on voltage source converter (VSC) technology, and which can be used to provide reactive power support to a power transmission network. It is capable of producing or absorbing reactive power and can be adjusted by a high-speed control system. A STATCOM may act as either a source or sink of reactive AC power to an electricity network. If the VSC is connected to a source of power such as battery, solar or wind generator, a STATCOM may also inject real AC power into the AC system. The STATCOM is a member of the flexible alternating current transmission system (FACTS) family of devices.

A STATCOM works by generating an AC current waveform leading or lagging the AC voltage, hence providing either inductive to capacitive reactive power. If it is inductive, the STATCOM can absorb reactive AC power. If it is capacitive, the STATCOM can generate reactive AC power. In this way, the STATCOM can function as a reactive power source or sink. The control of the reactive power is achieved by controlling the amplitude of the VSC converter voltage in respect to the grid voltage.

Since a typical VSC generates much lower voltage than grid voltage, there is a need to have a transformer between the VSC and the grid in a typical STATCOM system to match the voltage difference between the VSC and the electric grid. As an example, a typical STATCOM is depicted in FIG. 7.

It is desired to reduce costs associated with STATCOMs. It is also desired to improve performance of STATCOMs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are STATCOM systems and methods. According to an aspect, a STATCOM system includes a reactive component configured for electrical connection to a power network. For example, the reactive component may be a capacitor bank. The system also includes an inductor electrically connected in series with the reactive component. Further, the system includes a converter electrically connected in series with the reactive component and the inductor. A method may include using the static synchronous compensator system to provide one of reactive power and active power to the power network.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
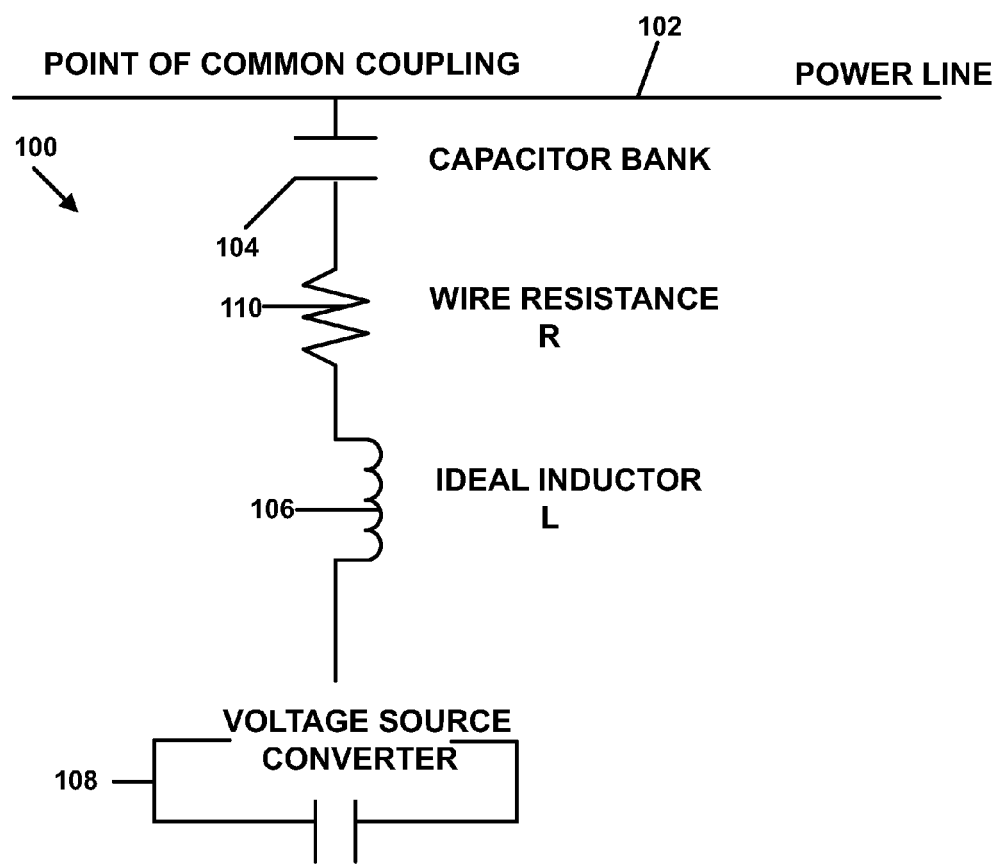
FIG. 1 is a schematic diagram of an example STATCOM system coupled to a power line of an electrical power transmission network in accordance with embodiments of the present disclosure.

FIG. 1 illustrates a schematic diagram of an example STATCOM system 100 coupled to a power line 102 of an electrical power transmission network in accordance with embodiments of the present disclosure. Referring to FIG. 1, the STATCOM system 100 includes a capacitor bank 104, an inductor 106, and a voltage source converter 108. The schematic diagram also shows a resistor component 110, which is representative of the wire resistance in the system 100.

The capacitor bank 104 may include one or more capacitors in series or in parallel to obtain desired capacitance and voltage rating. In this example, the capacitor bank 104 is electrically connected to the power line 102.

The inductor 106 is connected in series between the capacitor bank 104 and the converter 108. During operation of the system 100 together with the power network, the voltage of the inductor may be about 10% of the voltage of the power network. Further, the voltage provided by the converter is determined by the converter rating and the rest of the power network voltage may be supported by the capacitor bank 104.

Figure 2:
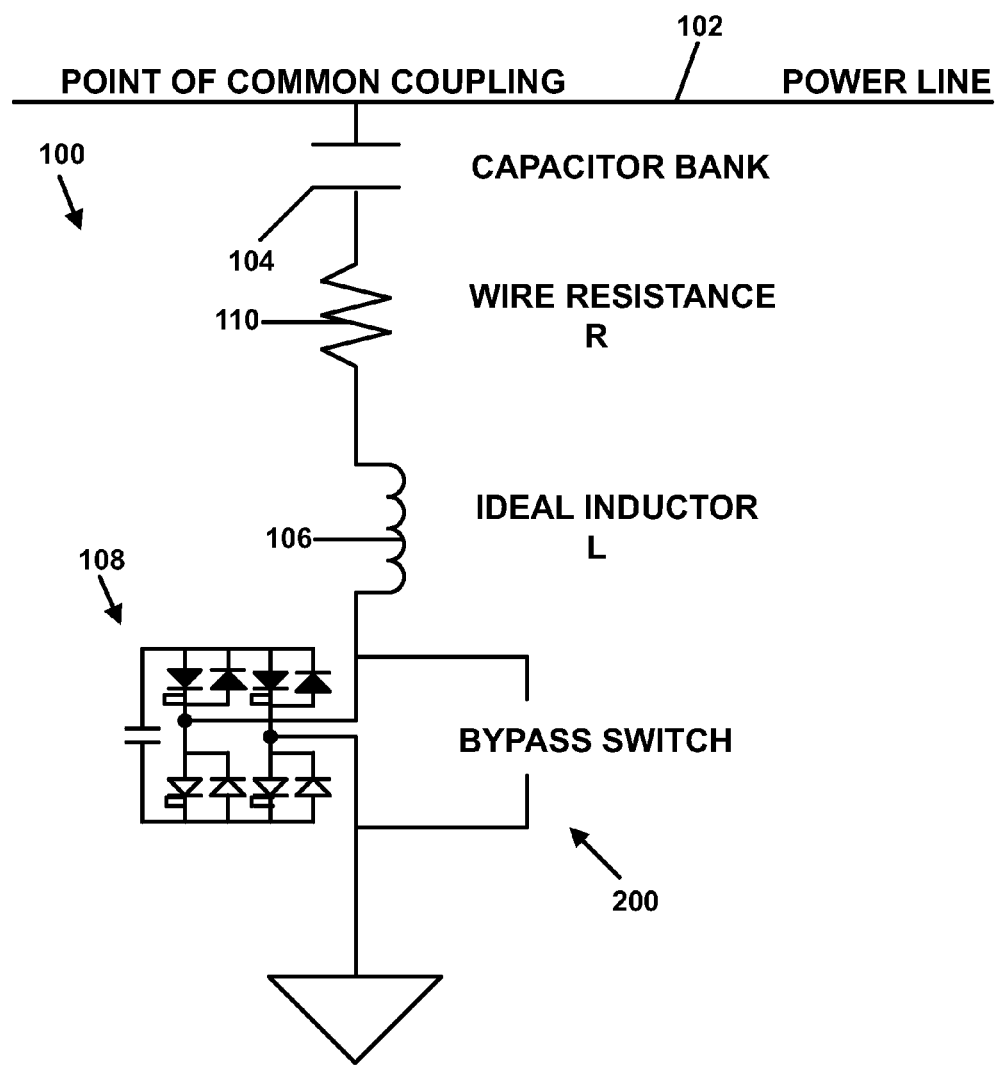
FIG. 2 is a schematic diagram of another example STATCOM system having a bypass switch in accordance with embodiments of the present disclosure.

The converter 108 may be any suitable converter. As an example, the converter 108 may be a single phase full bridge converter, one for each phase of the three phase power system (FIG. 2).

In accordance with embodiments of the present disclosure, a STATCOM system may include a bypass switch electrically connected in parallel with the converter. For example, FIG. 2 illustrates a schematic diagram of another example STATCOM system 100 having a bypass switch, generally designated 200, in accordance with embodiments of the present disclosure. Referring to FIG. 2, the system 100 is similar to the system 100 shown in FIG. 1 except that the system 100 of FIG. 2 includes the bypass switch 200 and a particular type of converter 108.

During operation with the bypass switch 200 closed, the converter is disabled and static volt-ampere (VAR) power is provided to the power network in accordance with the following equation:

$$VAR = \frac{V^2}{ZC - ZL}$$

where ZC is the impedance of the capacitor bank 104 and ZL is the impedance of inductor 106.

With the bypass switch 200 open, the converter starts up and can provide controllable or dynamic inductive or capacitive VAR to the power system. So the total VAR provided to the system is in accordance with the following equation: Total VAR=static VAR+−converter VAR. As an example, 30 MVAR+−10 MVAR dynamic can be provided to the power system if the converter rating is 10 MVA and the static VAR is 30 MVAR. Therefore, the total VAR provided by the STATCOM to the power system is the static VAR provided by the capacitor bank 104 and the inductor 106, and a dynamic VAR provided by the voltage source converter.

In accordance with embodiments of the present disclosure, the converter per phase current rating has to be equal or higher than the phase current Icon. The static VAR is therefore 1.73*Vpcc*Icon for a three phase system, wherein Vpcc corresponds to the line-to-line voltage of the power system. As an example, for a 13.8 kV power system with a static VAR of about 10 MVAR, Icon=10 MVAR/13.8 kV/1.73=418 A. If the converter can inject 2 kVrms output voltage Vcon, then the converter rating needed is about 2 kV*418 A=837 kVA per phase, such that the dynamic VAR is +−3*837=2.4 MVAR or 24% of the static VAR. If the converter can inject 4 kV RMS voltage, then the dynamic rating is doubled to 4.8 MVAR.

Figure 3:
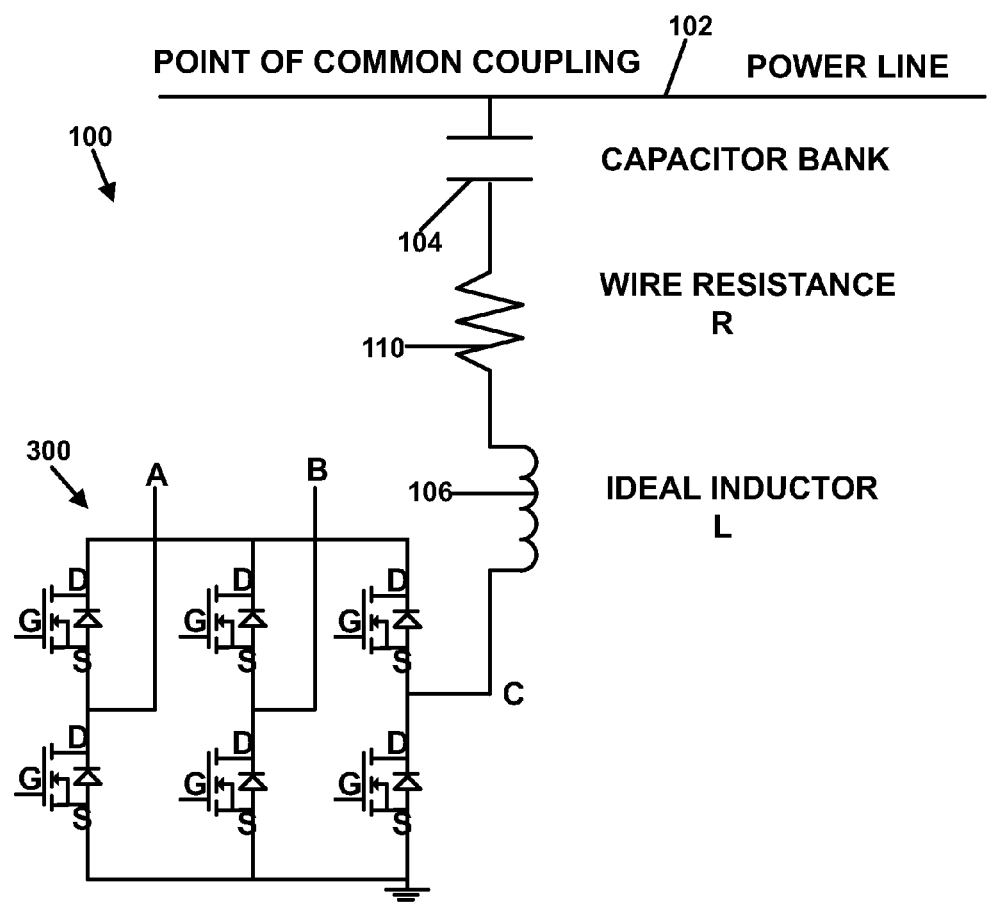
FIG. 3 is a schematic diagram of another example STATCOM system having a three phase voltage source converter in accordance with embodiments of the present disclosure.

In accordance with embodiments of the present disclosure, the converter of a STATCOM system may be a three phase voltage source converter. For example, FIG. 3 illustrates a schematic diagram of another example STATCOM system 100 having a three phase voltage source converter, generally designated 300, in accordance with embodiments of the present disclosure. Referring to FIG. 3, the figure only depicts the components of one phase of the converter 300, but it should be understood that the converter 300 also includes two other sets of components (or phases) having components similar to those shown.

Figure 4:
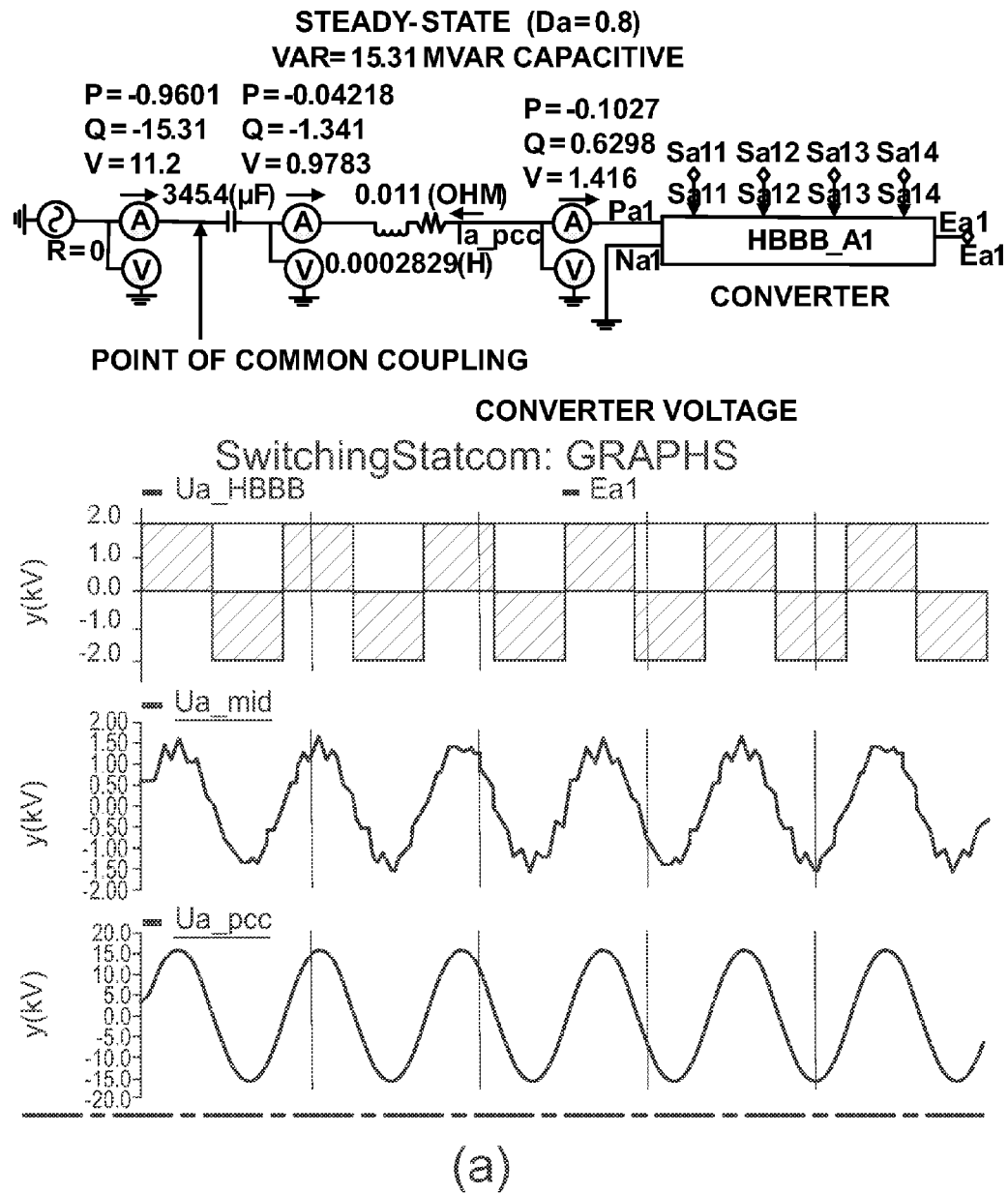
FIGS. 4-6 are graphs and a circuit diagram of a STATCOM system in accordance with embodiments of the present disclosure.
Figure 4:
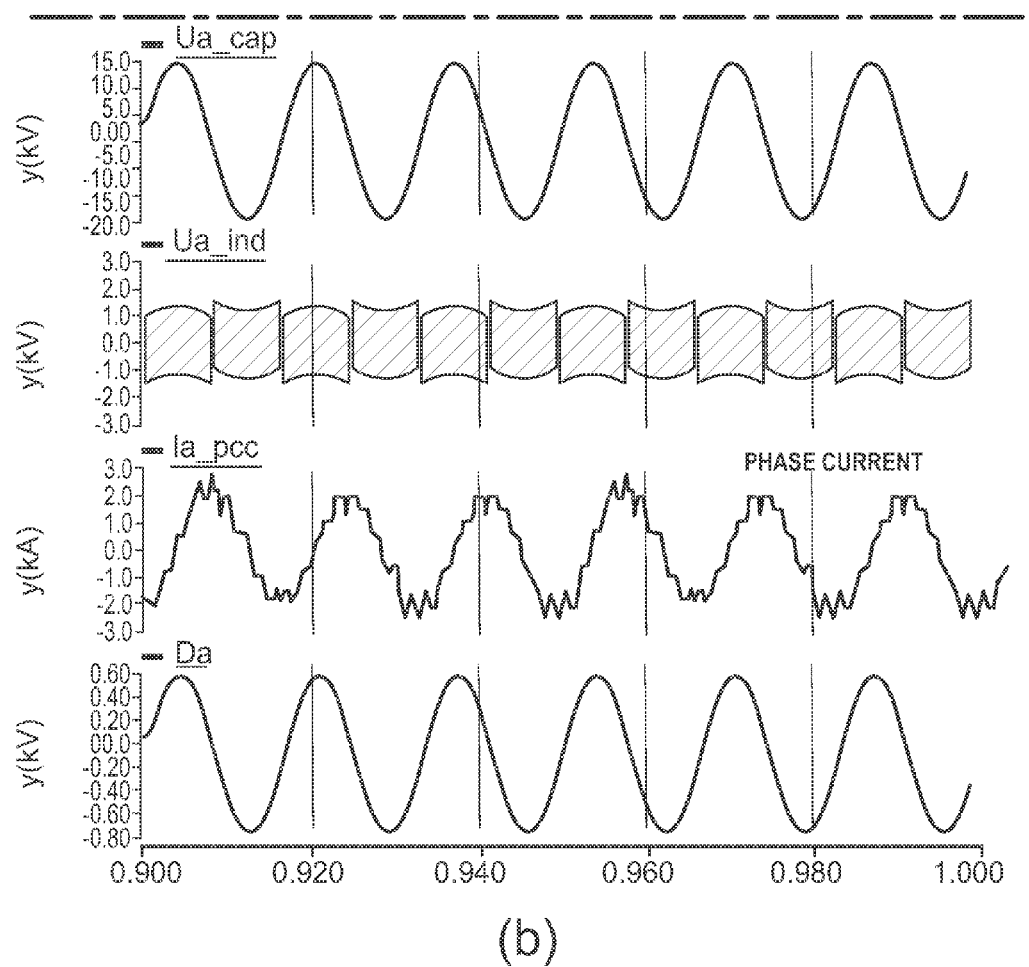

FIG. 4 illustrates simulated waveforms and circuit diagram of a STATCOM system in accordance with embodiments of the present disclosure. The simulated system has a phase rms voltage of 11.2 kV, capacitor bank value is 345 μF, inductor value is 283 uH. The converter DC bus voltage is 2 kV, therefore it can generate a maximum output voltage close to 2 kV/1.414=1.4 kVrms depends on the control method. Referring to FIG. 4, the graphs show voltage and current readings of the circuit components during operation when converter generates about 1.4 kVrms inductive output voltage or inductive VAR of 630 kVAR. For example, graph (a) depicts converter PWM output voltage over time. Graph (b) depicts the converter output voltage measured after the filter inductor. Graph (c) depicts power system phase voltage. Graph (d) depicts the voltage across the capacitor bank. Graph (e) depicts voltage across the inductor. Graph (f) depicts the resulting phase current. Graph (g) depicts a control command signal to the converter. In this example, overall VAR=15.31 MVAR capacitive.

Figure 5:
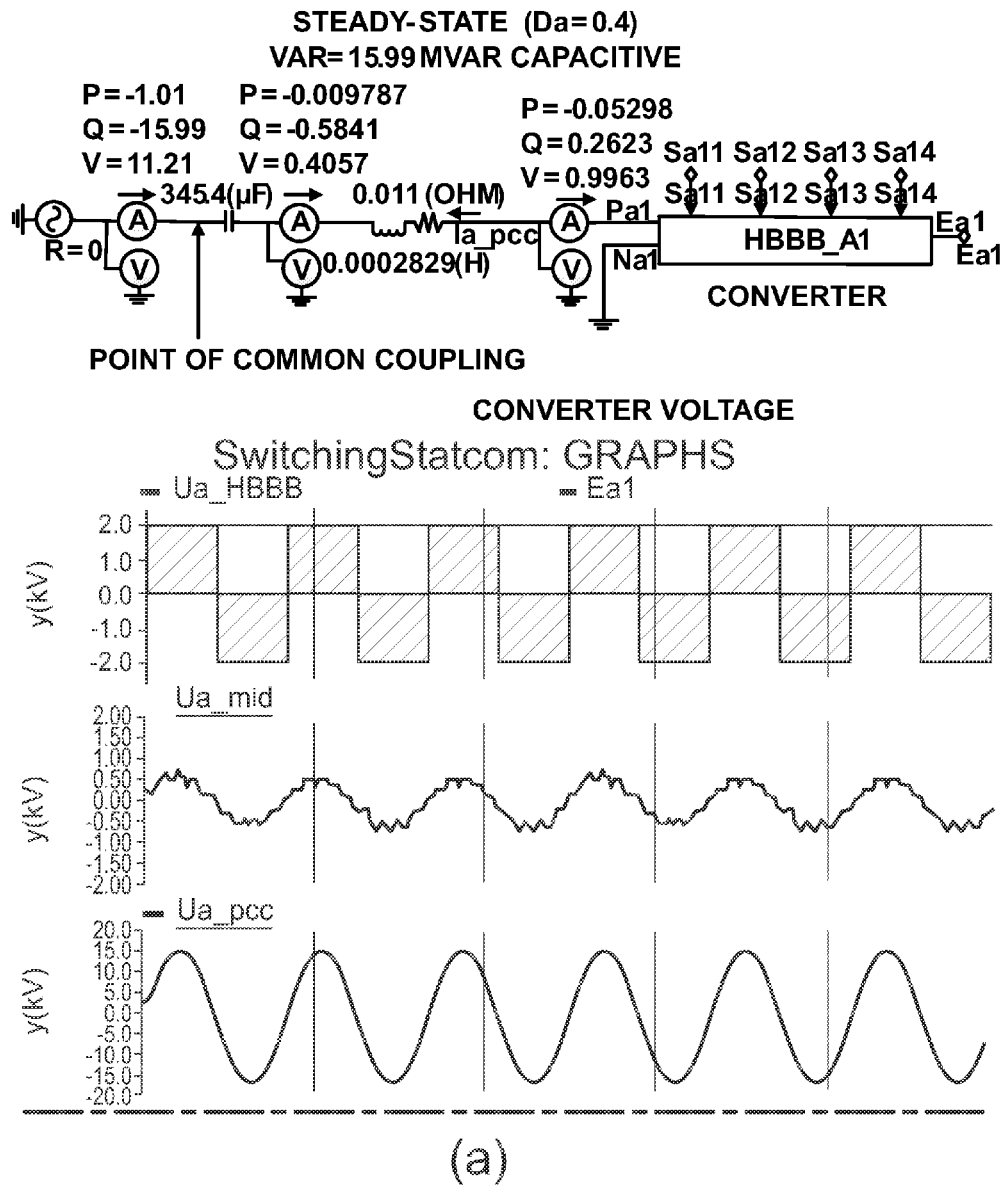
Figure 5:
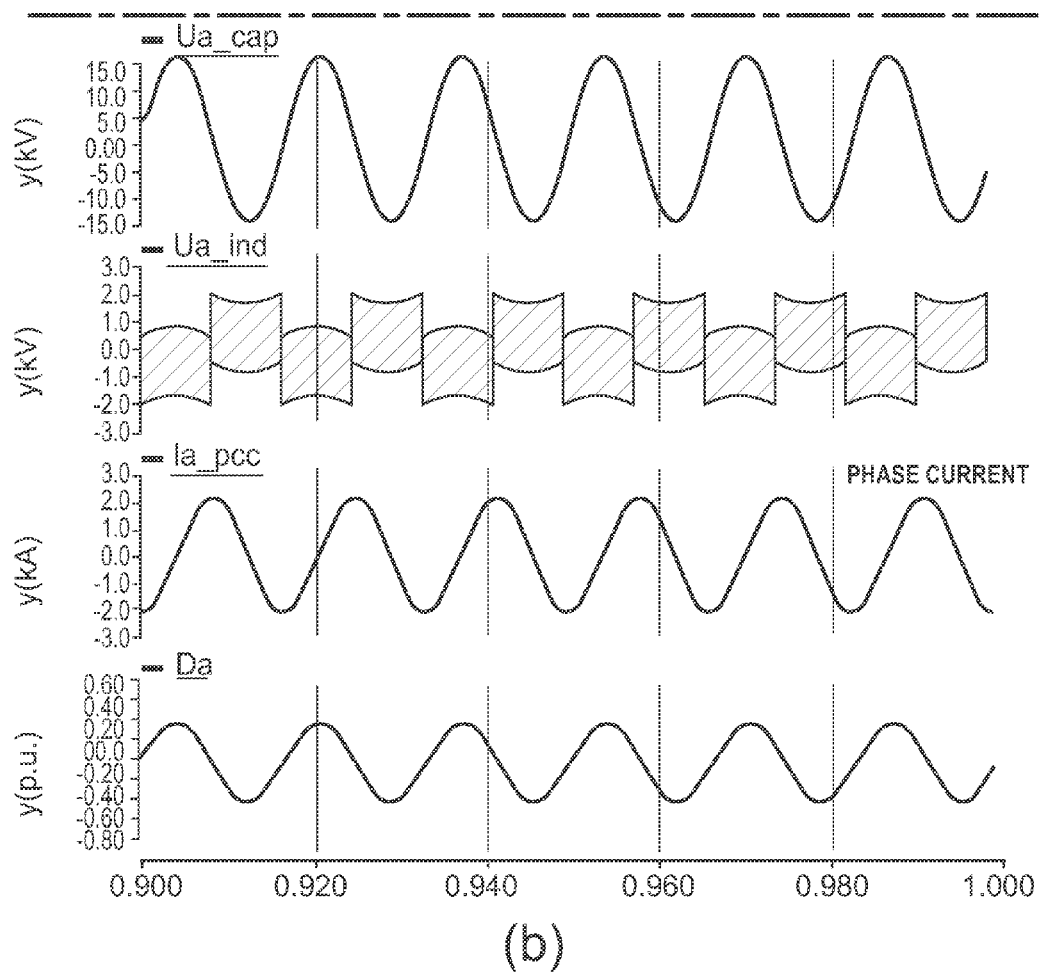

FIG. 5 illustrates graphs and a circuit diagram of a STATCOM system in accordance with embodiments of the present disclosure. Referring to FIG. 5, the graphs show voltage and current readings of the circuit components when converter generates about 996 Vrms inductive output or 262 kVAR. In this example, VAR=15.99 MVAR capacitive and is increased compared to FIG. 4 case.

Figure 6:
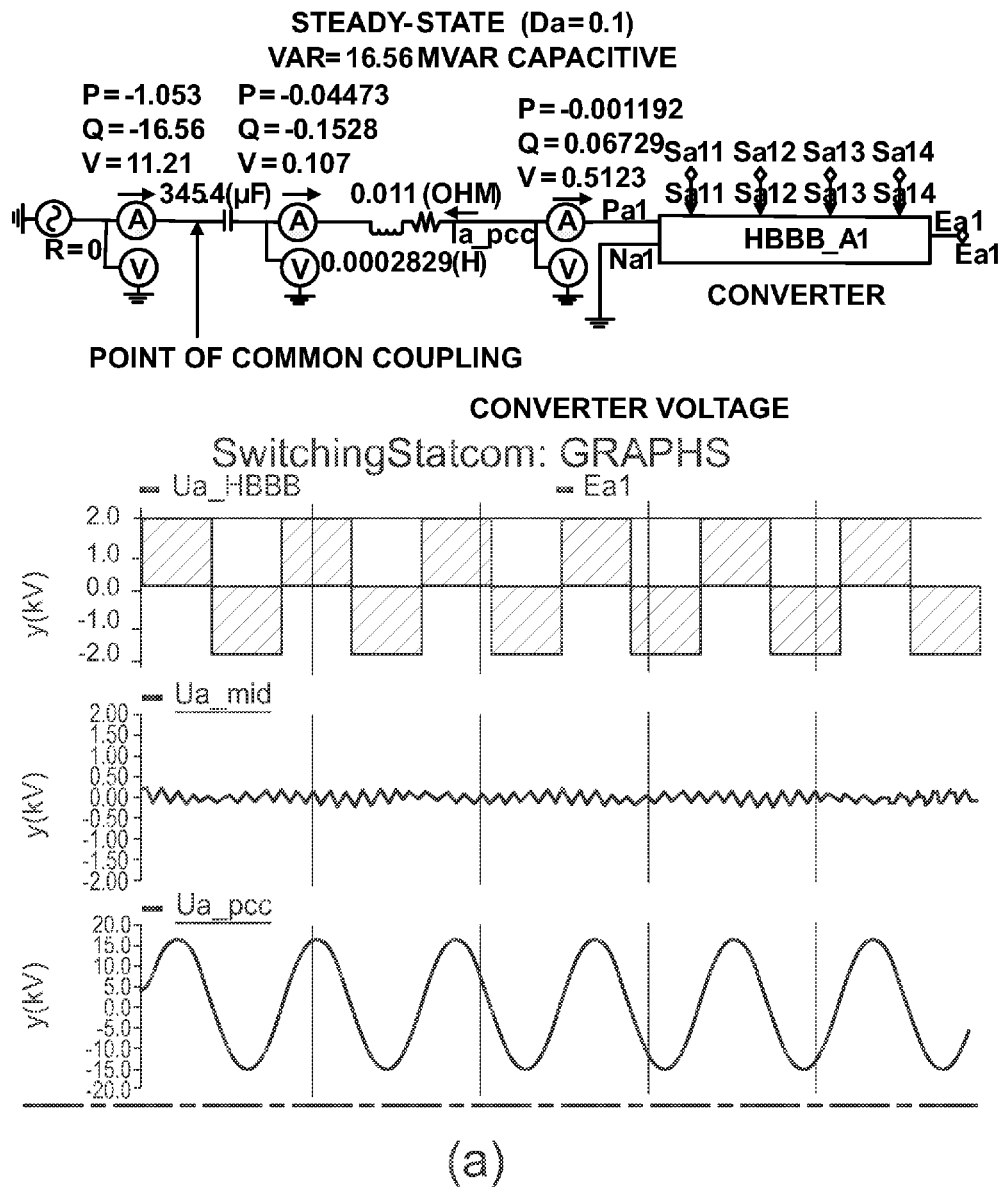
Figure 6:
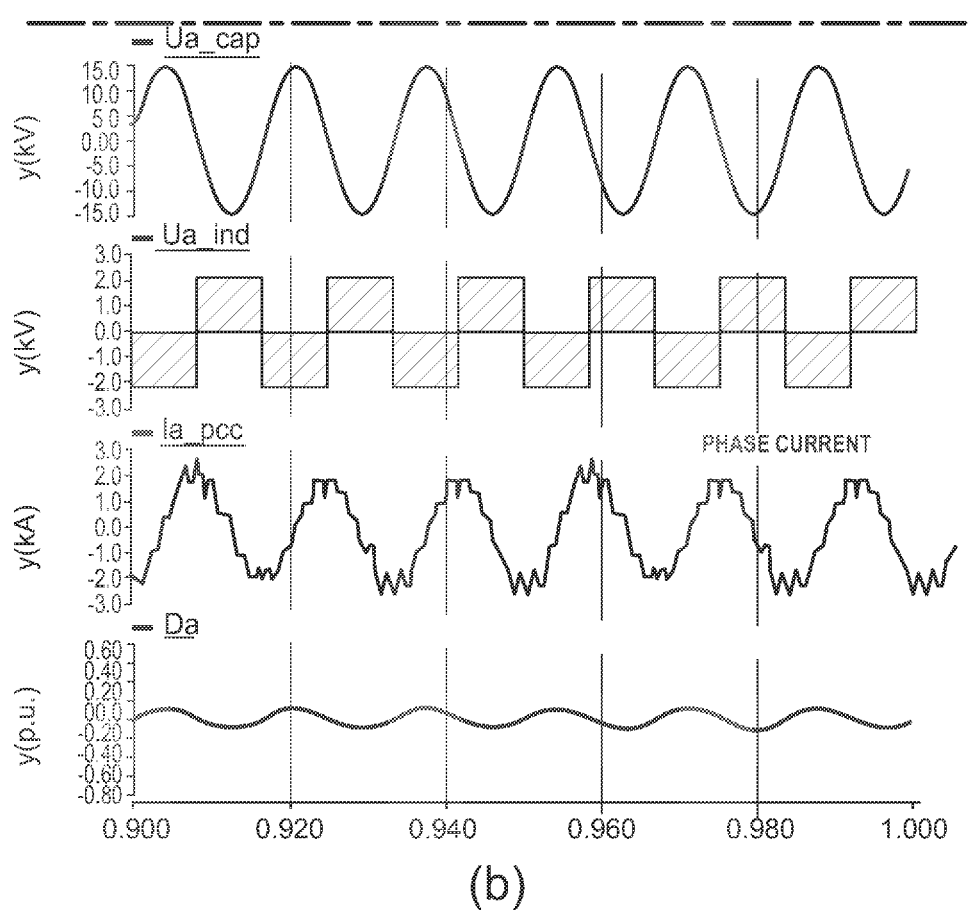
Figure 7:
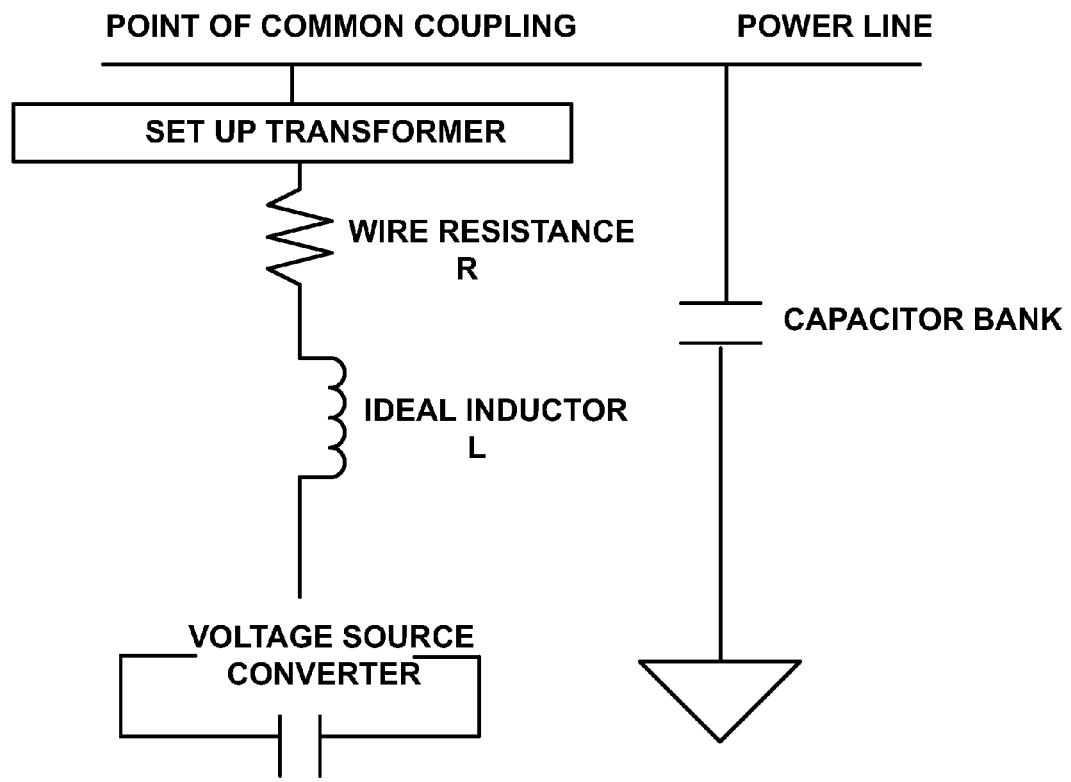
FIG. 7 is a schematic diagram of an example of a typical STATCOM system as known in the prior art.

FIG. 6 illustrates graphs and a circuit diagram of a STATCOM system in accordance with embodiments of the present disclosure. Referring to FIG. 6, the graphs show voltage and current readings of the circuit components when converter generates about 512 Vrms inductive output or 67 kVAR. In this example, VAR=16.56 MVAR capacitive and is increased compared to FIG. 4 case.

The above described STATCOM operation can be easily achieved by applying standard PWM control techniques to the VSC. Such techniques are easily understood by those working in similar fields. Specifically, they are achieved by controlling the VSC output voltage magnitude and angle in respect to the converter output current. The magnitude is controlled by controlling the PWM modulation index. The angle is controlled to be either leading or lagging the current by 90 degrees. In the example shown in FIG. 4 to FIG. 6, the converter voltage is leading the current by 90 degrees, indicating that the VSC is absorbing reactive power or behaving like an inductor.

Control of a STATCOM system as described herein may be suitably implemented with hardware or software or, where appropriate, with a combination of both. Aspects of the present subject matter are described with reference to block diagrams of apparatus (systems) according to embodiments of the presently disclosed subject matter. It will be understood that each block of the block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The block diagrams in the figures illustrate the architecture, functionality, and operation of possible implementations of systems, methods and computer program products according to various embodiments of the present subject matter. In this regard, each block in the block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the present subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present subject matter has been presented for purposes of illustration and description, but is not intended to be exhaustive or limited to the present subject matter in the form disclosed. Many modifications and variations will be apparent to those of ordinary skill in the art without departing from the scope and spirit of the present subject matter. The embodiment was chosen and described in order to best explain the principles of the present subject matter and the practical application, and to enable others of ordinary skill in the art to understand the present subject matter for various embodiments with various modifications as are suited to the particular use contemplated.

The descriptions of the various embodiments of the present subject matter have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A static synchronous compensator system comprising:
   a reactive component configured for electrical connection to a power network;
   an inductor electrically connected in series with the reactive component;
   a converter electrically connected in series with the reactive component and the inductor; and
   wherein, during operation of the static synchronous compensator system together with the power network, a voltage of the inductor is about 10% of the voltage of the power network, the voltage provided by the converter is determined by the converter rating and the rest of the power network voltage is supported by the reactive component.

2. The static synchronous compensator system of claim 1, wherein the reactive component comprises at least one capacitor.

3. The static synchronous compensator system of claim 1, wherein the reactive component comprises a capacitor bank.

4. The static synchronous synchronous compensator system of claim 1, wherein the reactive component comprises at least one inductor.

5. The static synchronous compensator system of claim 1, wherein the converter comprises a voltage source converter.

6. The static synchronous compensator system of claim 1, wherein the converter comprises a full bridge converter.

7. The static synchronous compensator system of claim 1, further comprising a bypass switch electrically connected in parallel with the converter.

8. The static synchronous compensator system of claim 7, wherein the bypass switch is configured to be controlled to close such that static volt-ampere reactive (VAR) power is provided to the power network.

9. The static synchronous compensator system of claim 7, wherein the bypass switch is configured to be controlled to open such that variable volt-ampere reactive (VAR) power is provided to the power network by a voltage source converter.

10. The static synchronous compensator system of claim 9, wherein a total volt-ampere reactive (VAR) provided by the system comprises the static VAR provided by the reactive component and the inductor, and a dynamic VAR provided by the voltage source converter.

11. A method comprising:
    providing a static synchronous compensator system comprising:
      a reactive component configured for electrical connection to a power network;
      an inductor electrically connected in series with the reactive component; and
      a converter electrically connected in series with the reactive component and the inductor; and
    using the static synchronous compensator system to provide one of reactive power and active power to the power network; and
    wherein, during operation of the static synchronous compensator system together with the power network, a voltage of the inductor is about 10% of the voltage of the power network, the voltage provided by the converter is determined by the converter rating and the rest of the power network voltage is supported by the reactive component.

12. The method of claim 11, wherein the reactive component comprises at least one capacitor.

13. The method of claim 11, wherein the reactive component comprises at least one inductor.

14. The method of claim 11, wherein the converter comprises a voltage source converter.

15. The method of claim 11, further comprising a bypass switch electrically connected in parallel with the converter.

16. The method of claim 15, wherein the bypass switch is configured to be controlled to close such that static volt-ampere reactive (VAR) power is provided to the power network.

17. The method of claim 16, wherein the bypass switch is configured to be controlled to open such that variable volt-ampere reactive (VAR) power is provided to the power network by a voltage source controller.

18. The method of claim 17, wherein a total volt-ampere reactive (VAR) provided by the system comprises the static VAR provided by the reactive component and the inductor, and a dynamic VAR provided by the voltage source converter.

* * * * *